United States Patent [19]

Mori

[11] Patent Number: 5,309,387

[45] Date of Patent: May 3, 1994

[54] TAMPER RESISTANT MODULE WITH LOGICAL ELEMENTS ARRANGED ON A SUBSTRATE TO PROTECT INFORMATION STORED IN THE SAME MODULE

[76] Inventor: Ryoichi Mori, c/o Institute of Information Sciences And Electronics University of Tsuku, 1-1, Tennodai, 1-chome, Tsukuba-shi, Ibaragi-ken, Japan

[21] Appl. No.: 972,747

[22] Filed: Nov. 6, 1992

Related U.S. Application Data

[60] Division of Ser. No. 845,767, Mar. 2, 1992, Pat. No. 5,185,717, which is a continuation of Ser. No. 387,845, Jul. 31, 1989, abandoned.

[30] Foreign Application Priority Data

Aug. 5, 1988 [JP] Japan .................................. 63-195847

[51] Int. Cl.⁵ .............................................. G11C 13/00
[52] U.S. Cl. ....................................... 365/52; 365/51; 365/201
[58] Field of Search ....................... 365/51, 52, 53, 201

[56] References Cited

U.S. PATENT DOCUMENTS 5,185,717 2/1993 Mori ....................................... 365/52
5,245,582 9/1993 Kimura ................................. 365/52

*Primary Examiner*—Terrell W. Fears
*Attorney, Agent, or Firm*—W. G. Fasse; W. F. Fasse

[57] ABSTRACT

The reliability of a tamper resistant module for safeguarding stored information, e.g. in an electronic computer system, is improved to deny access to the system by an unauthorized person or at least to a specific portion of the system. For this purpose, the module has for example a pair of substrates which are bonded together to confine confidential data inside the module. On the outer surfaces of the substrates, a plurality of logical elements, such as transistors, form detecting memory devices. The plurality of these detecting memory devices are operative under a normal condition, but at least one of these detecting memory devices is rendered inoperative when a tampering is applied to the outer surface of the substrate. In a tamper free normal situation all memory devices work properly. The inoperability of any of the detecting memory devices is detected when tampering occurs. When the tamper is detected, the confidential data confined within the module are erased.

8 Claims, 7 Drawing Sheets

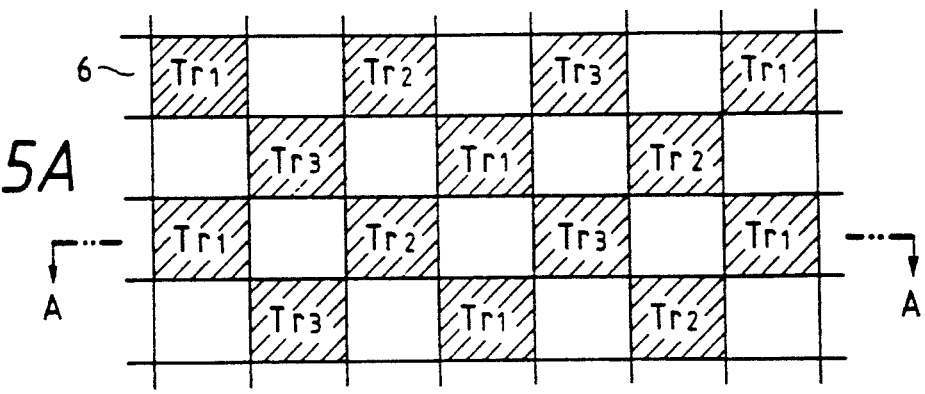
FIG. 5A
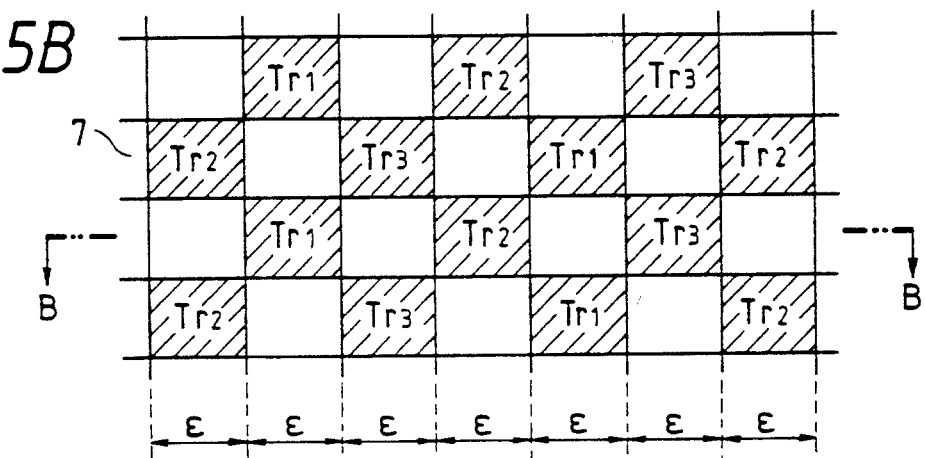
FIG. 5B
FIG. 5C
FIG. 5D
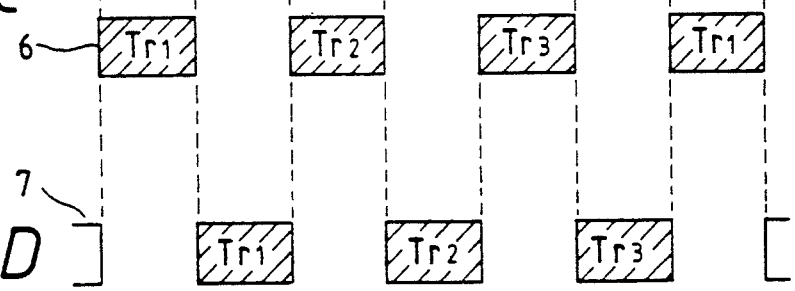

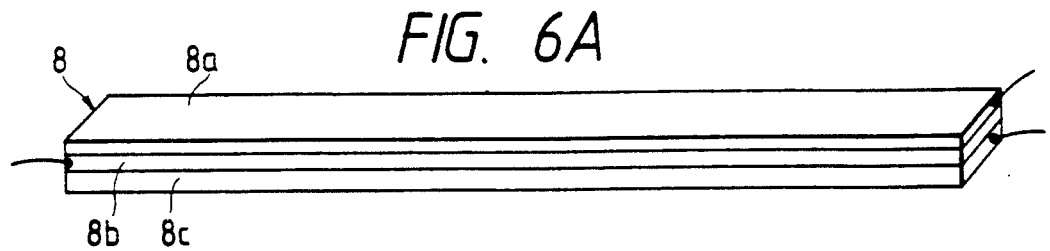
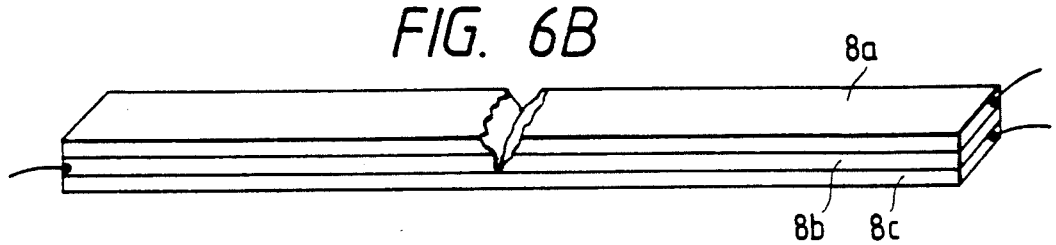
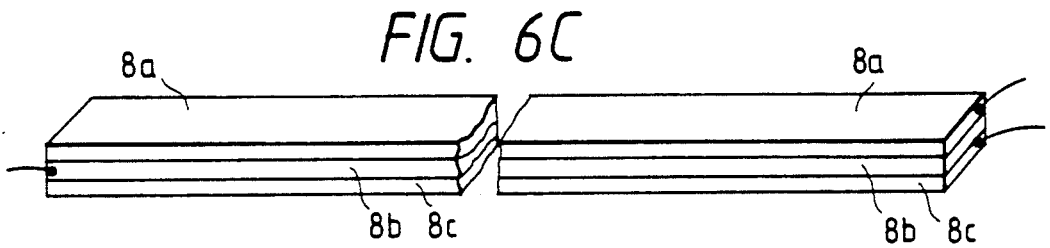
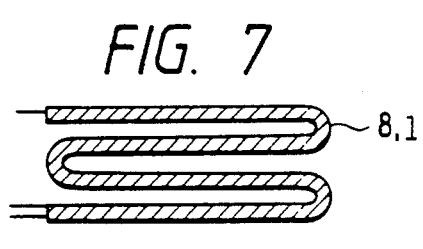
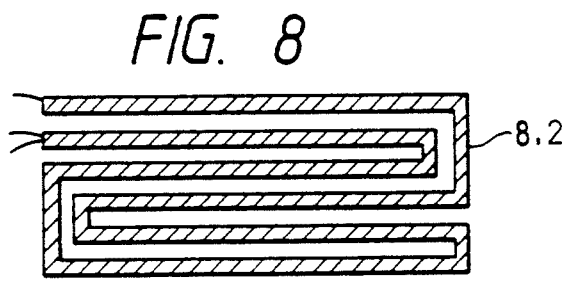
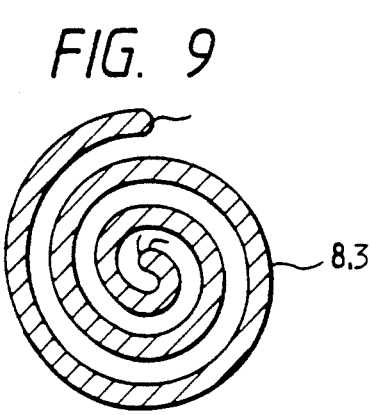
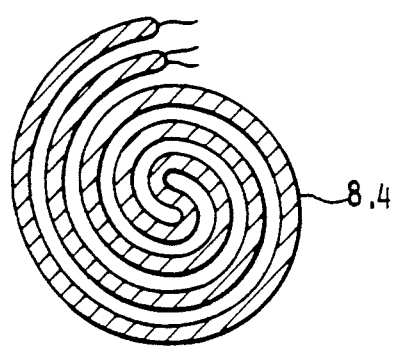

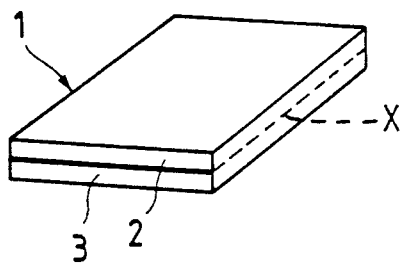
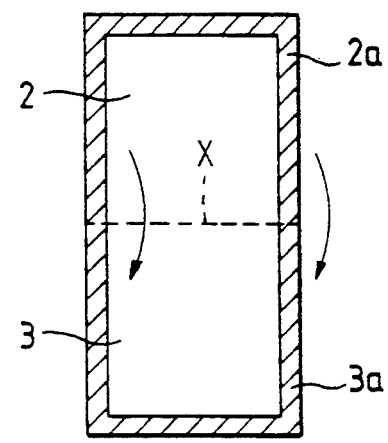
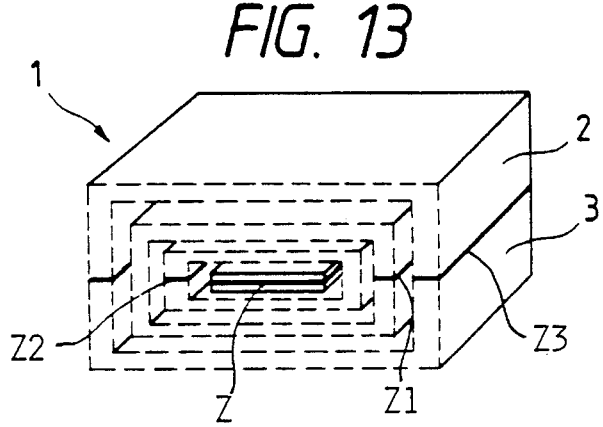
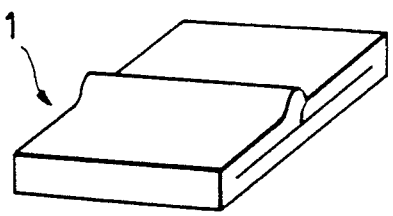
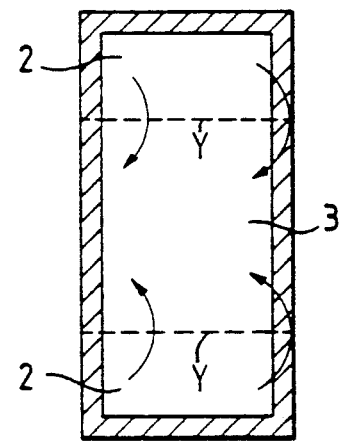

TAMPER RESISTANT MODULE WITH LOGICAL ELEMENTS ARRANGED ON A SUBSTRATE TO PROTECT INFORMATION STORED IN THE SAME MODULE

CROSS-REFERENCE TO RELATED APPLICATIONS

This is a divisional of U.S. Pat. application Ser. No.: 07/845,767, filed on Mar. 2, 1992, now U.S. Pat. No. 5,185,717 which in turn is an FWC of U.S. Ser. No.: 07/387,845 filed: Jul. 31, 1988 now abandoned.

BACKGROUND OF THE INVENTION

The present invention relates to a tamper resistant module for resisting against a tamper contemplating to decode confidential data confined within the module.

In order to prove reliability of security of an electronic computer system, a mechanism needs to be provided which does not permit an unauthorized person to physically access a specific portion of the computer system. Particularly, such a mechanism is needed to prohibit the unauthorized person from making a copy of the contents contained in a certain location of the system or from altering codes contained therein. To this end, a confidential portion of the system is confined within a module to preserve confidence. In case there is a tamper against the module contemplating to decode the confidential data confined therein, e.g. in case there is an activity to bore a hole in the module, such a tamper has conventionally been defended by erasing the confidential data.

Such a tamper resistant module is disclosed in "Physical Security for the μ ABYSS System" by Steve H. Weingart of IBM Thomas J. Watson Research Center, Proceedings, 1987 IEEE Symposium on Security and Privacy, Oakland, Calif., Apr. 27-29, 1987, p.p. 55-58. In this module, a thin wire such as a nichrome wire is wound about the module confining the confidential data therein. In case that the wire is cut, short-circuited or connection of the wire is changed, the tamper against the module is detected from the change in resistance of the wire, whereupon the confidential data is erased.

However, winding of the module is not suitable for mass production. Further, the resistance of the wire changes due to aging or in accordance with change in temperature or other ambient changes. For such reasons, notwithstanding the fact that the tamper is not existing, the confidential data tends to be erroneously erased. In contrast, despite the fact that the tamper is existing, the existing tamper cannot be detected with the result that the module fails to erase the confidential data.

SUMMARY OF THE INVENTION

The present invention has been made in view of the foregoing, and it is an object of the invention to provide a tamper resistant module which is suitable for mass production and which does not erroneously erase confidential data contained in the tamper resistant module resulting from erroneous detection of a tamper.

In order to achieve this and other objects, there is provided a tamper resistant module comprising a substrate having an inner surface and an outer surface, confidential data being confined to the inner surface of the substrate, a plurality of logical elements arranged on the outer surface of the substrate, the plurality of logical elements being operative under a normal condition, at least one of the plurality of logical elements being rendered inoperative when a tamper is applied to the outer surface of the substrate, and detecting means for detecting operability of the plurality of logical elements to thus detect the tamper applied to the outer surface of the substrate.

In order that an unauthorized person may not be succeeded in decoding the confidential data confined in the module, the confidential data is erased when the detecting means detects the tamper applied to the outer surface of the substrate.

The logical elements can be memory devices, such as RAMs, and which are arranged on the outer surface of the substrate. Therefore, it is possible to mass produce the modules and to exclude erroneous detection of the tamper.

BRIEF DESCRIPTION OF THE DRAWINGS

The present invention will be described by way of non-limitative embodiments, in which:

FIGS. 5A and 5B are plan views and FIGS. 5C and 5D are cross-sectional views cut along lines A—A and B—B in FIGS. 5A and 5B, showing a tamper resistant module according to yet another embodiment of the present invention;

FIGS. 6A, 6B and 6C is a perspective view showing a tamper resistant module according to a further embodiment of the present invention;

FIG. 7 is a plan view showing a tamper resistant module according to still further embodiment of the present invention;

FIG. 8 is a plan view showing a tamper resistant module according to yet further embodiment of the present invention;

FIG. 9 is a plan view showing a tamper resistant module according to another embodiment of the present invention;

FIG. 10 is a plan view showing a tamper resistant module according to further embodiment of the present invention;

FIG. 11 is a perspective view showing a tamper resistant module according to still further embodiment of the present invention;

FIG. 12 is a plan view showing a tamper resistant module according to yet further embodiment of the present invention;

FIG. 13 is a perspective view showing a tamper resistant module according to further embodiment of the present invention;

FIG. 14 is a perspective view showing a tamper resistant module according to still further embodiment of the present invention;

FIG. 15 is a plan view showing a tamper resistant module according to yet further embodiment of the present invention;

DETAILED DESCRIPTION OF THE PREFERRED EMBODIMENTS

Figure 1:
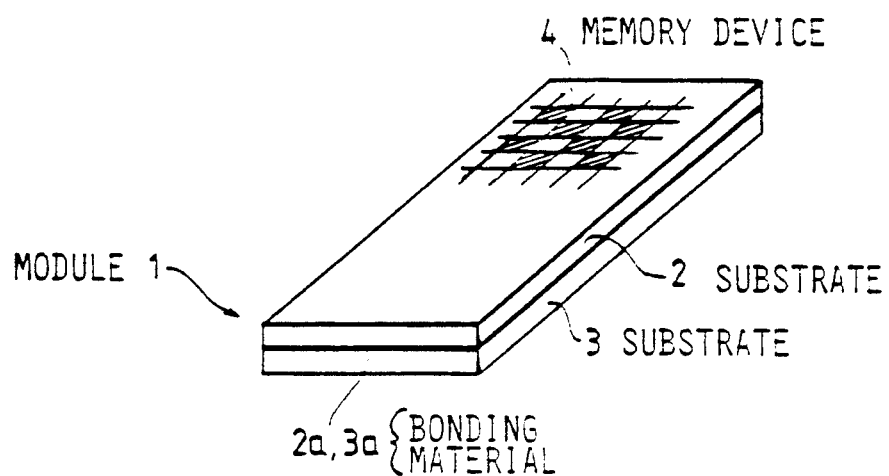
FIG. 1 is a perspective view showing a tamper resistant module according to one embodiment of the present invention.
Figure 2:
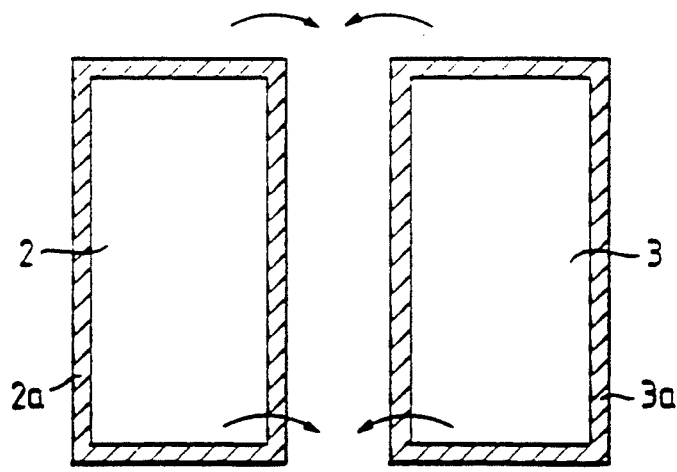
FIG. 2 is a plan view showing a tamper resistant module according to another embodiment of the present invention.

FIG. 1 is a perspective view showing a tamper resistant module according to a first embodiment of the present invention, and FIG. 2 is an exploded perspective view showing the tamper resistant module shown in FIG. 1. Throughout the specification, the term "tamper" will be used which refers to an act contemplating to decode confidential data contained in a memory by a mechanical force, a temperature change, chemicals, biochemical measure or a laser beam, etc.

As shown in FIG. 1, the tamper resistant module is comprised of a pair of substrates 2, 3. The substrates 2, 3 have inner surfaces to be bonded together, on the peripheral regions of which bonding areas 2a, 3a are provided as indicated by oblique lines in FIG. 2. Memory devices are present even beneath the bonding areas 2a, 3a. Two substrates 2, 3 are bonded together by directly applying a bonding material to the memory devices 4 or by an adhesive piece fixedly attached to the memory devices 4. The determination of the size of the bonding area and the selection of the bonding material are made so that the bonding strength of the substrates 2, 3 is larger than a strength of the respective layers of a transistor 8 (to be described later with reference to FIG. 6) against separation force.

The tamper resistant module thus fabricated can be made extremely thin and has an accuracy in detecting a tamper imparted to the module from the horizontal direction as well as a tamper from the vertical direction. Even for a thick tamper resistant module, the tamper detecting accuracy in the horizontal direction can be maintained at the similar level to that in the vertical direction by depositing the memory devices on the side surface of the module.

Confidential data are stored in the confidential circuit 14 of FIG. 20 (to be described below) inside of the bonding areas 2a, 3a. A bonding or adhesive material is coated on the peripheral portion of one of the substrates 2, 3. It is to be noted that the tamper resistant module is a rectangular shape having a side ranging from less than one millimeter to several centimeters. The size of the module can freely be determined although there is a minimum limitation attendant to the size of the memory device 4.

Figure 3A:
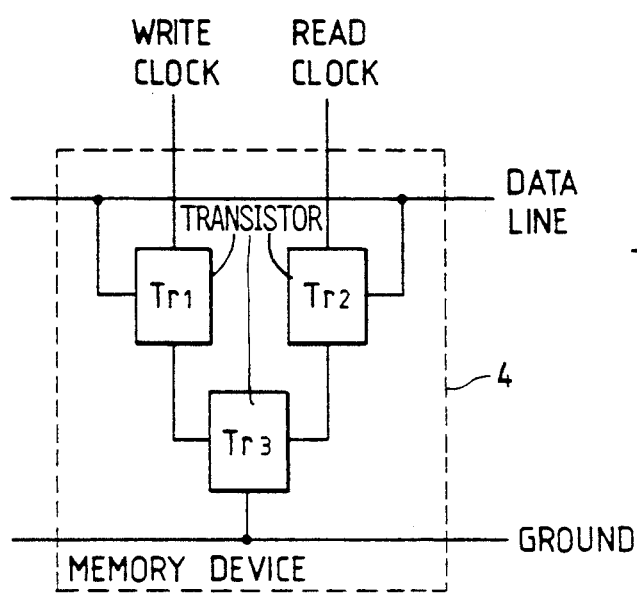
FIGS. 3A and 3B is a block diagram showing a connection of transistors constituting a memory device provided in the tamper resistant module according to the embodiment of the present invention.
Figure 3B:
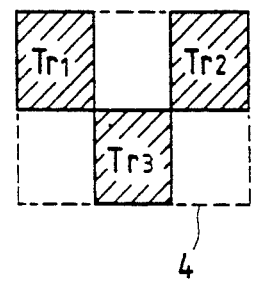

In the upper surface of the upper substrate 2 and the lower surface of the lower substrate 3, the memory device 4 as shown in FIG. 3 is deposited through a vapor phase method or the like. The memory device 4 shown in FIG. 3 is in the configuration of a dynamic memory including three transistors Tr1, Tr2 and Tr3. Such a memory is disclosed in the "The VLSI designer's Library" by J. Newkirk and R. Mathews, Addison-Wisley, 1983. The memory device 4 is not necessarily be of a dynamic type but a static type memory is available. A plurality of the memory devices 4 are arranged in line on the surfaces of the substrates 2, 3. Each memory device 4 has a write clock line, read clock line, data line, and ground line, which lines are interconnected among the plurality of memory devices. In FIG. 1 only a part of the plurality of the memory devices are depicted with an enlarged scale. The size of each of the transistors Tr1, Tr2 and Tr3 is several ten microns. In order to simplify the indication of the memory device 4 as in FIG. 3A, it will be depicted in a manner as shown in FIG. 3B.

Figure 4A:
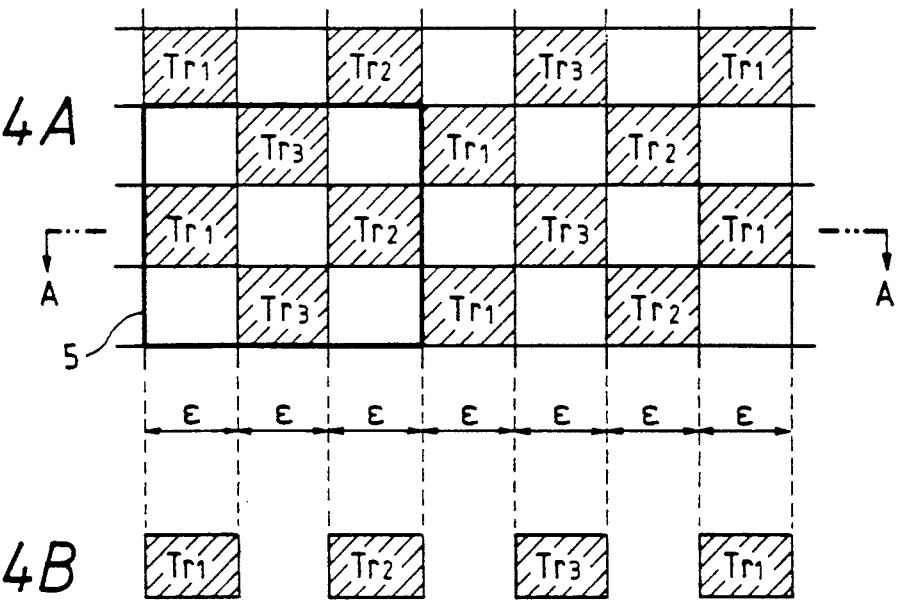
FIGS. 4A and 4B are a plan view and a cross-sectional view cut along a line A—A in FIG. 4A showing, respectively, a tamper resistant module according to still another embodiment of the tamper resistant module of the present invention.
Figure 4B:

The memory devices 4 are arranged on the surfaces of the substrates 2, 3 as shown in FIG. 4 or 5. Specifically, the transistors Tr1, Tr2 and Tr3 are arranged in staggered fashion. The cross-section of the memory device 4 cut along a line A—A in FIG. 4A is as shown in FIG. 4B.

Should one or more than one of the transistors Tr1, Tr2 and Tr3 be tampered, the memory device 4 loses its function. With a circuit shown in FIG. 20 (to be described later), the contents of the detecting memory device 4 are written in and then immediately read out in repetitive manner to cover all the detecting memory devices of the module to thereby detect tampered memory device. When the tampered memory is detected, the confidential data stored in the confidential circuit 14 is erased presuming that the detecting memory device 4 is tampered.

It should be noted that there are two different groups of RAM cells in a tamper-resistant module. Confidential circuit 14, which is confined within the inner surface of the module, contains the memory proper. Memory device 4, which occupies the outer surface of the module, is the detecting memory device. Using memory for independent tamper-detecting circuitry as described here provides better detection and analysis of errors, whatever their cause, than could be obtained by using the same amount of memory for conventional redundancy checking. The reason is as follows.

It is possible to precisely control the timing relation between reading and writing for a detecting memory device, as well as the history more generally of the device. This history is independent of the reading and writing history of the bits to be protected and residing in the confidential circuit 14, We can test the detecting memory device by writing to it and reading from it with any desired intervals between successive actions.

In conventional memory organizations where redundancy is used for error detection and analysis, these timing relations and histories are not known because they depend on the behavior of the application program that is using the memory. When examining a particular bit in a conventional memory, we do not know for certain when it was last written nor whether it was written with a one or a zero. The redundancy bits provide only a probabilistic guess as to what the correct state is and no information at all about when the last state transition took place.

If an error is found when testing a detecting memory device, we can adjust the testing interval so as to determine the likely nature of the error: soft (transient), hard (permanent but accidental), or malicious (caused by a tamper with the device).

(1) If the error does not persist after repeated write-read cycles with short intervals, we assume that it is a soft error.

(2) If the error does not appear to be a soft error, we check the cells physically adjacent to the one that manifested the error. If the fraction of adjacent cells that are in error is less than some threshold, we assume that the error is a hard error.

(3) If the error is neither a soft error nor a hard error, we assume that it is caused by a tamper. The correct response in this case is to erase the confidential data in the inner surface.

In the example shown in FIG. 4, the detecting memory device 4 is pessimistically assumed to be operative even if a part of each of the transistors Tr1, Tr2 and Tr3 is lost. Even so, the tamper can be detected if a portion ($3\epsilon \times 3\epsilon$ in size) surrounded by a thick solid line 5 is lost where $\epsilon$ is the size of each transistor.

In the example shown in FIG. 5, a first layer 6 is superposed on a second layer 7. Specifically, the first and second layers 6 and 7 are superposed so that the cross-section of FIG. 5A cut along a ling A—A is as shown in FIG. 5C, while the cross-section of FIG. 5B cut along a line B—B is as shown in FIG. 5D. When the first layer 6 and the second layer 7 receive a tamper from outside, the transistors in the first layer 6 and in the second layer 7 fill the blank space each other. Therefore, the tamper can be detected when an opening of about $2\epsilon \times 2\epsilon$ is formed.

Based upon this theory, if the detecting memory device 4 is fabricated with a multiplicity of layers, the diameter of a detectable hole can be reduced to $\epsilon$ at minimum. Further, in detecting operability of the detecting memory device 4, the sensitivity of the tamper detection can be adjusted by ANDing or ORing the relevant layers, whereby it becomes possible to avoid erroneous detection of temporary or eternal malfunction of the memory device 4. Further, it may be possible to avoid erroneous detection of the tamer by the provision of the memory device 4 in part of the outer surface of the substrate depending upon the portion where the confidential data is present.

In FIGS. 1 through 5, description has been made with reference to the memory device 4 in which a number of square-shaped MOS transistors Tr1, Tr2, Tr3 are arranged. However, elongated-shape transistors are also available. Such an example is shown in FIG. 6 in which one side of the MOS transistor 8 is elongated. In FIG. 6A, the transistor 8 is fabricated with three layers of source 8a, gate 8b and drain 8c. Lead wires of the source 8a and drain 8c extend rightwards and the lead wire of the gate 8b extends leftwards. The transistor 8 is deposited on the upper surface of the substrate 2 and the lower surface of the substrate 3 (see FIG. 1) through a vapor phase method or the like. Either the source 8a or the drain 8c may be arranged externally of the tamper resistant module 1.

In the examples shown in FIGS. 6B and 6C, the source 8a is arranged externally of the tamper resistant module 1. The example shown in FIG. 6B shows the case where the source 8a and the gate 8b are subjected to mechanical tampers. If the two layers of the transistor 8 are separated as shown caused by the tamper, the transistor 8 loses its function. The inoperative memory device including such a transistor 8 is detected, the confidential data contained in the confidential circuit 14 is erased on the presumption that the detecting memory device 4 is tampered.

While FIG. 6 shows a linear shaped transistor, FIG. 7 shows a transistor folded in a zig-zag form. The lead wires of the source 8a and drain 8c are extended to the left lower side and the lead wire of the gate 8b is extended to right upper side in FIG. 7. The transistor 8 is deposited on the upper surface of the substrate 2 and the lower surface of the substrate 2 (see FIG. 1) through a vapor phase method. Each transistor 8 shown in FIG. 7 has a large area so that the number of the transistors arranged in the substrate 2 or 3 can be reduced.

FIG. 8 is a modification of the embodiment shown in FIG. 7. The lead wires of the source 8a, gate 8b and drain 8c are extended from upper left side of the figure, thereby facilitating the wiring. In addition, the embodiment shown in FIG. 8 is of a bifilar winding so that induction signals induced in forward and backward paths can be cancelled out and thus a noise margin can be set to high.

While FIG. 6 shows the embodiment in which the transistor 8 is in a linear shape, FIG. 9 shows an embodiment in which the transistor 8 is spirally configured. The lead wires of the source 8a and the drain 8c are extended from the center portion and the lead wire of the gate 8b is extended from the outer circumferential portion. Each transistor 8 shown in FIG. 9 has a large area so that the number of the transistors arranged in the substrate 2 or 3 can be reduced.

FIG. 10 is a modification of the embodiment shown in FIG. 9. The lead wires of the source 8a, gate 8b and drain 8c are extended from the outer circumferential portion, thereby facilitating the wiring. In addition, the embodiment shown in FIG. 10 is also of a bifilar winding so that induction signals induced in forward and backward paths can be cancelled out and thus the noise margin can be set to high.

FIG. 11 is a perspective view showing a modification of the tamper resistant module shown in FIG. 1. In FIG. 11, the same reference numerals as used in FIG. 1 designate the same components as those shown in FIG. 1, and duplicate description thereof will be omitted herein.

In the tamper resistant module shown in FIG. 11, the substrates 2 and 3 are formed with a single elongated substrate as shown in FIG. 12. Bonding of the substrates 2, 3 are achieved by folding the elongated substrate along a dotted line. The determination of the size of the bonding area and the selection of the bonding material are made so that the bonding strength of the substrates 2, 3 is larger than a strength of the respective layers of a transistor 8 (to be described later with reference to FIG. 6) against separation force.

When the elongated substrate is folded to bond the substrates 2, 3 together, the strength of the folded portion is differentiated from that of the bonded portion. FIG. 13 is a modification of the FIG. 12 embodiment in which four layers are superposed and are folded together to make the strengths in the folded portion and the bonded portion substantially even. In this modification, the positions of the folded portions are located in different positions. Specifically, the folded portion of the first combination of the innermost substrates 2 and 3 is located in the upper position in FIG. 13, the folded portion of the second combination of the substrates 2 and 3 is located in the rightward direction, the folded portion of the third combination of the substrates 2 and 3 is located in the leftward direction, and the folded portion of the fourth combination of the outermost substrates 2 and 3 is located in the lower position. In this manner, the positions in which the folded portions are located are made different, the strengths of the module against the mechanical tampers imparted from the upper, lower, right and left directions can be made substantially even.

FIG. 14 is a further modification of the tamper resistant module shown in FIG. 1. In FIG. 14, the same reference numerals as those in FIG. 1 or FIGS. 11 through 13 designate the same components as those shown therein, and duplicate description thereof will be omitted herein. The tamper resistant module of FIG. 14 is formed with a single elongated substrate as shown in FIG. 15. The elongated substrate is folded along dotted lines in the directions as indicated in FIG. 15 so as to partially overlap the end portions of the substrate.

In the case where the tamper resistant module 1 is made in a manner as described, the strength in the central overlapped portion differs from that in the remaining portion. In the embodiment shown in FIG. 16, one combination of the substrates 2, 3 are provided to wrap another combination of the substrates 2, 3, where the overlapped zones of the substrates 2, 3 intersect with each other. Specifically, the inner combination of the substrates 2, 3 is disposed so that its overlapped portion is oriented in a first direction and the outer combination of the substrates 2, 3 is disposed so that its overlapped zone is oriented in a second direction orthogonal to the first direction. Since the overlapped zones of the inner and outer combinations of the substrates 2, 3 intersect with each other, the strength of the tamper resistant module 1 can be made substantially even against the tamper applied from the first and second directions.

Figure 16:
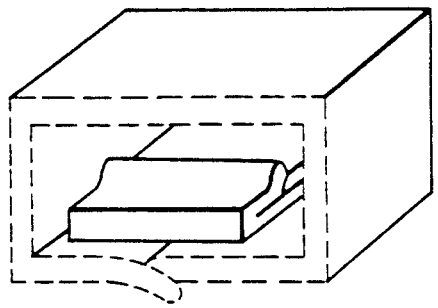
FIG. 16 is a perspective view showing a tamper resistant module according to further embodiment of the present invention.
Figure 17:
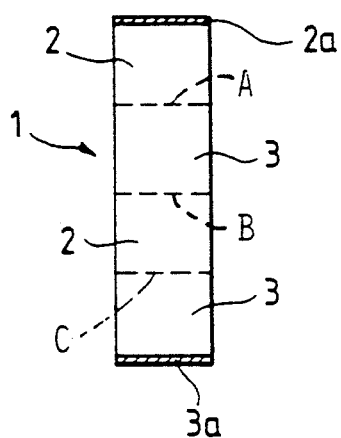
FIG. 17 is a plan view showing a tamper resistant module according to still further embodiment of the present invention.
Figure 18:
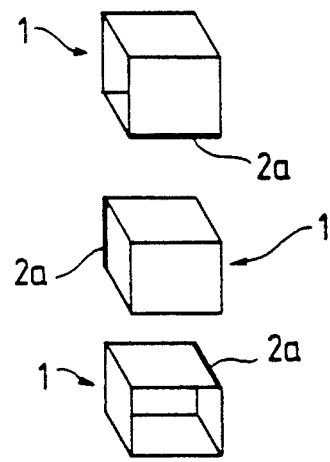
FIG. 18 is a perspective view showing a tamper resistant module according to yet further embodiment of the present invention.
Figure 19:
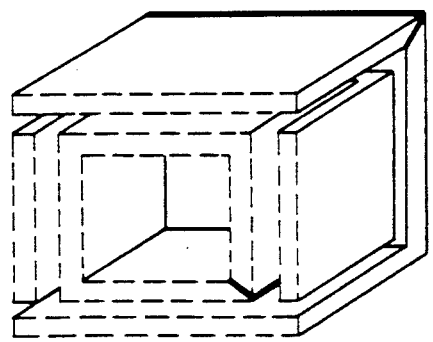
FIG. 19 is a perspective view showing a tamper resistant module according to still further embodiment of the present invention.

FIGS. 17 through 19 are perspective views showing another modifications of the tamper resistant module shown in FIG. 1. In FIGS. 17 through 19, the same reference numerals as those in FIGS. 11 through 16 designate the same components as those shown therein, and duplicate description thereof will be omitted herein.

In the tamper resistant module of FIG. 17, the substrates 2, 3 are formed with a single rectangular substrate. The rectangular substrate is folded inwardly along the dotted lines, whereupon the bonding areas 2a, 3a are bonded together.

In the embodiment shown in FIG. 18, three tamper resistant modules are combined together, in which the positions of the bonding zones are different from one another. These three tamper resistant modules are combined to form a cubic, thereby allowing confidential data to dispose inside the cubic.

Figure 20:
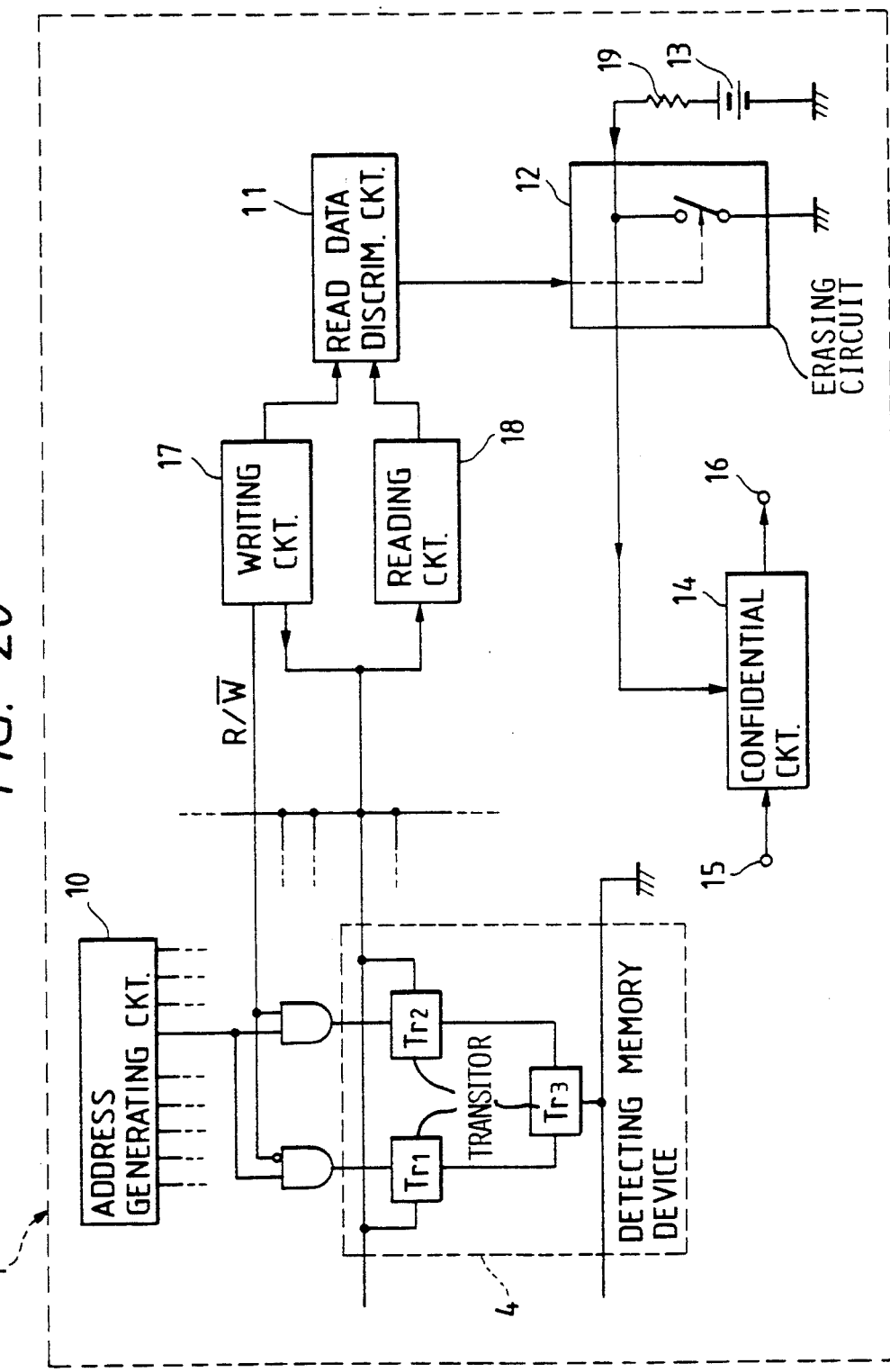
FIG. 20 is a block diagram showing a tamper resistant module according to the embodiment of the present invention.

FIG. 20 is a block diagram showing a circuit for erasing confidential data which is rendered operative when a tamper is detected. The confidential data have been written in a confidential circuit 14 which is constructed with a random access memory (RAM). Disposed inside of the tamper resistant module are an address generating circuit 10, a read data discriminating circuit 11, confidential data erasing circuit 12, a writing circuit 17 and a reading circuit 18 together with the confidential circuit 14. The memory device 4 is disposed outside of the tamper resistant module 1. A power supply 13 may be provided either inside of the tamper resistant module 1 or outside thereof if a backup is provided or an instantaneous interruption of the power supply can be appropriately dealt with.

The circuit diagram shown in FIG. 20 is provided for the memory device 4 which is made of a dynamic RAM 4. To the memory device 4, an address signal is supplied from the address generating circuit 10. The writing circuit 17 writes bits indicative of a random value or a predetermined value in the memory device 4 designated by the address. The address generating circuit 10 is constructed, for example, with a counter, which performs addressing for all the memory devices 4. The contents of the memory device 4 is immediately read out by the reading circuit 18. Although the memory device 4 is constructed with the dynamic RAM, no refresh operation is required.

The data written in the memory device 4 and the data read out of the memory device 4 are fed to the read data discriminating circuit 11. The latter circuit 11 is constituted, for example, with an exclusive logic OR circuit and checks whether or not the data written in the memory device 4 is in coincidence with the data read out of the memory device 4. Upon inverting the value written in the memory device 4, i.e. inverting "0" and "1", the discriminating circuit 11 further checks whether or not the data written in the memory device 4 is in coincidence with the data read out of the memory device 4. By the implementation of such checkings, functions imposed to all the transistors Tr1, Tr2, Tr3 constituting the memory device 4 can be perfectly examined. The results of the examination is supplied to the confidential data erasing circuit 12.

The confidential data erasing circuit 12 is, for example, comprised of an analog switch which allows the power supply 13 to connect ground through a resistor 19. The circuit 12 is normally in an open state. Due to the open state of the circuit 12, the power is supplied to the confidential circuit 14 to hold the confidential data stored therein. The confidential data is written in the confidential circuit 14 through an input terminal 15 and is read out thereof from an output terminal 16. The read out confidential data is used only within the tamper resistant module 1. In the event that there is a tamper against the tamper resistant module 1, either of the transistors Tr1, Tr2, Tr3 is damaged with the result that the memory 4 loses its function and the data written therein cannot be properly outputted, that is, there will be an inconsistency between the written-in and read-out contents.

If such an inconsistency exists between the written-in and read-out contents, the read data discriminating circuit 11 detects the inconsistency and renders the confidential data erasing circuit ON. When the confidential data erasing circuit is rendered ON, power supplied to the confidential circuit 14 is interrupted and hence the contents stored therein is erased.

It is not necessary that the power supply 13 and power supplies to the memory devices 4, address generating circuit 10, read data discriminating circuit 11, confidential data erasing circuit 12, writing circuit 17 and the reading circuit 18 be batteries contained in the tamper resistant module 1, but they may be a combination of a commercial power supply and an external or internal backup battery for use in the case of interruption of the commercial power supply. In the case where the power supply battery is externally provided, an external or internal large quantity capacitor may be provided to compensate for an instantaneous interruption of the external commercial power supply.

In the event that the power supply should be interrupted, that is, in the case where the backup battery has been removed or has been used up and the external commercial power supply has been interrupted for a long period of time, the protection of the confidential data in the confidential circuit 14 can be accomplished if the operating voltages and the time constant have been set so that the turn off of the power supply to the memory devices 4, address generating circuit 10, read data discriminating circuit 11, confidential circuit 12, writing circuit 17 and reading circuit 18 occurs after the turn off of the power supply to the confidential circuit 14. Because, insofar as the storing contents (confidential data) exist in the confidential circuit 14, the tamper detecting function and the confidential data erasing function remain in force.

Under an extremely low temperature, the storing contents (confidential data) is sometimes maintained in the confidential circuit 14 without need for the power supply. The tamper resistant module is required to protect the confidential data from a temperature tamper. Since the period of time during which the temperature of the module shifts from the normal operating temperature to the extremely low temperature is sufficiently long, such a temperature tamper can be detected during this period of time, whereupon the storing contents in the confidential circuit 14 are erased.

The circuit shown in FIG. 20 can be modified in a variety of ways. For example, the memory device 4 may not be a RAM but be a read-only memory (ROM) or an erasable programmable read-only memory (EPROM). If the memory device 4 is constituted with the ROM or the EPROM, all or part of the writing circuit can be dispensed with.

A time required to cyclically examine all the detecting memory devices 4 must be shorter than a time required to access the confidential data starting from the tamper. The latter time is in the order of several seconds. Therefore, the time for examining all the memory devices 4 is allowed to be slower than, for example, a refresh cycle of a video display memory. In the case where the number of the memory devices 4 is extremely large, they may be divided into a plurality of banks and a corresponding number of tamper detection circuits may be provided in one-to-one correspondence to the plurality of banks, whereby the detection speed can be increased.

There are cases where no detecting device is present in a particular address or the detecting device in a certain address is inoperative. In such cases, it is possible not to carry out the tamper detection for that nonexistent or inoperative portions. If there are a considerable number of addresses which are not subjected to tamper detection, non-examination bit map may be employed on which indicated are the addresses which are not subjected to tamper detection. The non-examination bit map is constituted with a ROM. After the manufacture of the tamper resistant module and before the shipment thereof, a search is conducted to find out absence of the detecting device or the malfunction of the detecting device, whereupon the resultant data is written in the ROM.

The device protected by the tamper resistant module shown in FIG. 20 can communicate with an external station. Further, an address holding register may be provided to store the address outputted from the address generating circuit 10 when the read data discriminating circuit 11 detects the tamper for utilizing the stored data in the subsequently performed examination. A time holding register may be provided to store the output from a real time clock when the read data discriminating circuit 11 detects the tamper for use in the subsequent examination.

Upon measuring the power supply voltage or an ambient temperature, the circuit can be modified to detect the tamper if there is a significant change in the power supply voltage or the ambient temperature.

Although the present invention has been described with reference to specific embodiments, a variety of changes and modifications may be made without departing from the scope and spirit of the invention. For example, although in the above described embodiments, the detecting memory devices are provided externally of the module in which the confidential data is contained and the tamper detection is performed through the detection of the storing contents in the detecting memory devices, the tamper detection can also be accomplished by the detection of the operations of digital devices other than the memory devices, e.g. shift register, logic devices using super conductive materials.

What is claimed is:

1. A tamper resistant module for safeguarding stored confidential information, comprising substrate means having an inner surface and an outer surface, memory means supported on said inner surface of said substrate means for storing said confidential information in said memory means means supported on said outer surface of said substrate means for providing a testing value, tamper detection circuit means on said inner surface connected to said testing value providing means and to said memory means for erasing said confidential information from said memory means when a tamper is detected in response to said testing value, said tamper detection circuit means comprising address generating circuit means connected to said testing value providing means for supplying address signals to said testing value providing means, a reading circuit connected to said testing value providing means for reading said testing value from said testing value providing means, and testing value comparing circuit means connected to said reading circuit for comparing values from said reading to provide a tamper detection signal if there is any difference between values from said testing value and from said reading circuit.

2. The tamper resistant module of claim 1, further comprising a writing circuit connected to said testing value providing means for writing said testing value into an address of said testing value providing means, said testing value comparing circuit means being connected to said writing circuit and to said reading circuit for comparing values from said reading and writing circuits to provide a tamper detection signal if there is no coincidence between values from said writing circuit and from said reading circuit.

3. The tamper resistant module of claim 1, further comprising erasing circuit means connected to said comparing circuit and to said memory means for erasing said confidential information in response to said tamper detection signal.

4. The tamper resistant module of claim 1, wherein said testing value providing means comprise of a plurality of logical elements arranged in at least two layers on said substrate means.

5. The tamper resistant module of claim 1, wherein said testing value providing means comprise a ROM.

6. The tamper resistant module of claim 1, wherein said testing value providing means comprise an erasable, programmable read-only memory (EPROM).

7. The tamper resistant module of claim 2, wherein said testing value providing means comprise a dynamic RAM.

8. The tamper resistant module of claim 2, wherein said testing value providing means comprise a static RAM.

* * * * *

UNITED STATES PATENT AND TRADEMARK OFFICE
CERTIFICATE OF CORRECTION

PATENT NO. : 5,309,387
DATED : May 3, 1994
INVENTOR(S) : Ryoichi Mori

It is certified that error appears in the above-indentified patent and that said Letters Patent is hereby corrected as shown below:

Column 1, line 12, "1988" should read —1989—.
Column 10, line 22, delete "means".

Signed and Sealed this

Twenty-fifth Day of October, 1994

Attest:

BRUCE LEHMAN

*Attesting Officer*     Commissioner of Patents and Trademarks

UNITED STATES PATENT AND TRADEMARK OFFICE
CERTIFICATE OF CORRECTION

PATENT NO. : 5,309,387
DATED     : May 3, 1994
INVENTOR(S) : Ryoichi Mori

It is certified that error appears in the above-indentified patent and that said Letters Patent is hereby corrected as shown below:

On the title page, item (76) Inventor: Replace "University of Tsuku" with --University of Tsukuba --.

Signed and Sealed this

Twenty-first Day of February, 1995

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO.   : 5,309,387
DATED        : May 3, 1994
INVENTOR(S)  : Ryoichi Mori

It is certified that error appears in the above-indentified patent and that said Letters Patent is hereby corrected as shown below:

The title page should be deleted to appear as per attached sheet.

Columns 1-10, should be deleted and replaced with columns 1-12.

Signed and Sealed this

Twentieth Day of June, 1995

*Attest:*

BRUCE LEHMAN

*Attesting Officer*     *Commissioner of Patents and Trademarks*

United States Patent [19]

Mori

[11] Patent Number: 5,309,387
[45] Date of Patent: May 3, 1994

[54] TAMPER RESISTANT MODULE WITH LOGICAL ELEMENTS ARRANGED ON A SUBSTRATE TO PROTECT INFORMATION STORED IN THE SAME MODULE

[76] Inventor: Ryoichi Mori, c/o Institute of Information Sciences And Electronics University Tsukuba, 1-1, Tennodai, 1-chome, Tsukuba-shi, Ibaragi-ken, Japan

[21] Appl. No.: 972,747

[22] Filed: Nov. 6, 1992

Related U.S. Application Data

[60] Division of Ser. No. 845,767, Mar. 2, 1992, Pat. No. 5,185,717, which is a continuation of Ser. No. 387,845, Jul. 31, 1989, abandoned.

[30] Foreign Application Priority Data

Aug. 5, 1988 [JP] Japan .................. 63-195847

[51] Int. Cl.⁵ .................................. G11C 13/00
[52] U.S. Cl. .................................. 365/52; 365/51; 365/201
[58] Field of Search .................. 365/51, 52, 53, 201

[56] References Cited

U.S. PATENT DOCUMENTS 5,185,717 2/1993 Mori ........................... 365/52
5,245,582 9/1993 Kimura ....................... 365/52

Primary Examiner—Terrell W. Fears
Attorney, Agent, or Firm—W. G. Fasse; W. F. Fasse

[57] ABSTRACT

The reliability of a tamper resistant module for safeguarding stored information, e.g. in an electronic computer system, is improved to deny access to the system by an unauthorized person or at least to a specific portion of the system. For this purpose, the module has for example a pair of substrates which are bonded together to confine confidential data inside the module. On the outer surfaces of the substrates, a plurality of logical elements, such as transistors, form detecting memory devices. The plurality of these detecting memory devices are operative under a normal condition, but at least one of these detecting memory devices is rendered inoperative when a tampering is applied to the outer surface of the substrate. In a tamper free normal situation all memory devices work properly. The inoperability of any of the detecting devices is detected when tampering occurs. When the tamper is detected, the confidential data confined within the module are erased.

8 Claims, 7 Drawing Sheets

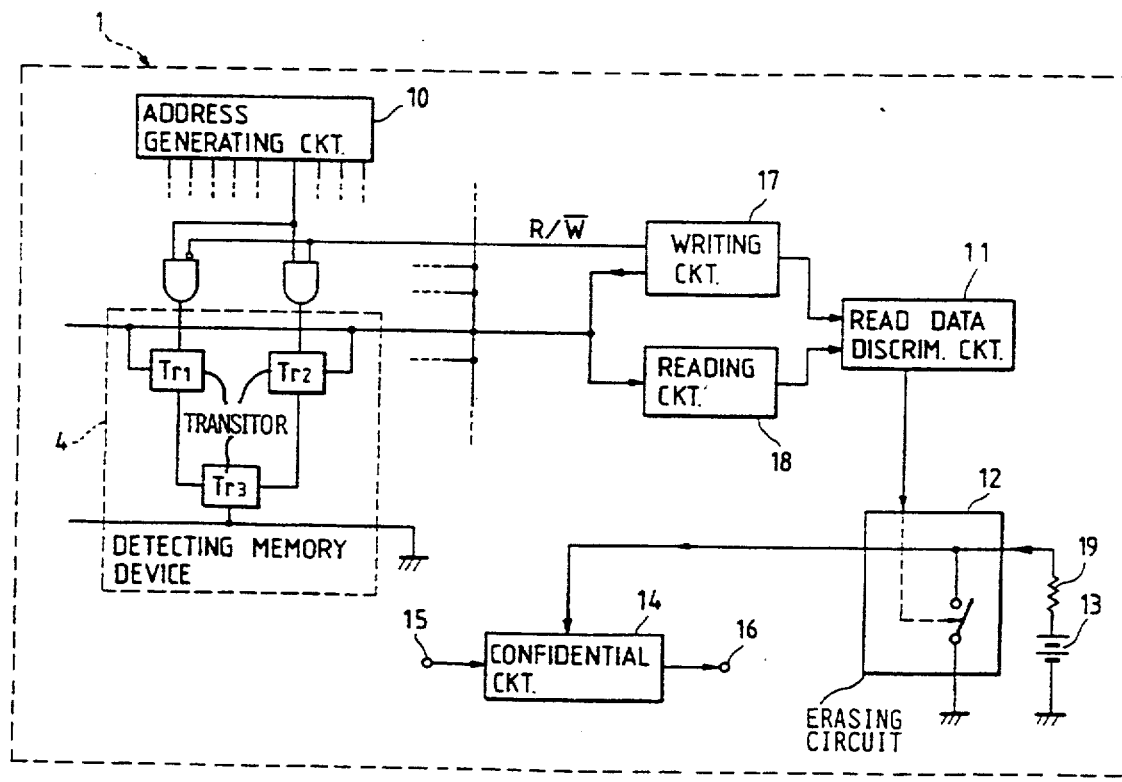

TAMPER RESISTANT MODULE WITH LOGICAL ELEMENTS ARRANGED ON A SUBSTRATE TO PROTECT INFORMATION STORED IN THE SAME MODULE

CROSS-REFERENCE TO RELATED APPLICATIONS

This is a divisional of U.S. patent application Ser. No.: 07/845,767, filed on Mar. 2, 1992, now U.S. Pat. No. 5,185,717, which in turn is an FWC of U.S. Ser. No.: 07/387,845 filed: Jul. 31, 1989, now abandoned.

FIELD OF THE INVENTION

The present invention relates to a tamper resistant module for safeguarding stored information by resisting against any attempt to decode confidential data stored in the module.

BACKGROUND INFORMATION

In order to make the security of an electronic computer system reliable, a mechanism is needed which does not permit an unauthorized person to physically access a specific portion of the computer system. Particularly, such a mechanism is needed to prohibit any unauthorized person from making a copy of the contents contained in a certain location of the system or from altering codes contained therein. To this end, a confidential portion of the system is confined within a module to preserve the confidentiality of the system. In case there is an attempt to tamper with the module to decode the confidential data stored therein, e.g. when an attempt is made to bore a hole in the module, it is conventional to defend against the attempt by erasing the confidential data in response to the boring.

A tamper resistant module, as mentioned above is disclosed in "Physical Security for the μ ABYSS System" by Steve H. Weingart of IBM Thomas J. Watson Research Center, Proceedings, 1987 IEEE Symposium on Security and Privacy, Oakland, Calif., Apr. 27-29, 1987, pp. 55-58. In the known module, a thin wire such as a nichrome wire is wound about the module which holds the confidential data therein. In case that the wire is cut, short-circuited, or the connection of the wire is changed, such tampering with the module is detected from the change in resistance of the wire, in response to which the confidential data is erased.

However, winding of the wire on the module is not suitable for mass production. Further, the resistance of the wire changes due to aging, or in accordance with a change in temperature, or due to other ambient changes. Thus, notwithstanding the fact that an attempt to tamper is not occurring, the confidential data can be erroneously erased. Furthermore, despite the fact that an attempt to tamper is occurring, such an attempt may not be detected with the result that the module fails to erase the confidential data contained in the module.

SUMMARY OF THE INVENTION

In view of the foregoing it is an object of the invention to provide a tamper resistant module for safeguarding stored information, which module is suitable for mass production and which does not erroneously erase confidential data contained in the tamper resistant module as a result of an erroneous detection of a tampering attempt when in fact there was no tampering attempt.

In order to achieve the foregoing and other objects, there is provided a tamper resistant module for safeguarding stored information comprising a substrate having an inner surface and an outer surface, confidential data being confined to the inner surface of the substrate, a plurality of logical elements arranged on the outer surface of the substrate, the plurality of logical elements being operative under a normal condition, at least one of the plurality of logical elements being rendered inoperative when a tamper is applied to the outer surface of the substrate, and detecting means for detecting operability of the plurality of logical elements to thus detect the tamper applied to the outer surface of the substrate. The logical elements are arranged in multiple layers.

In order that an unauthorized person may not succeed in decoding the confidential data confined in the module, the confidential data is erased when the detecting means detects the tamper applied to the outer surface of the substrate.

The logical elements can be memory devices, such as RAMs, which are arranged on the outer surface of the substrate. Therefore, it is possible to mass produce the modules and to exclude erroneous detection of a tamper.

BRIEF DESCRIPTION OF THE DRAWINGS

The present invention will be described by way of non-limitative embodiments, in which:

FIG. 1 is a perspective view showing a tamper resistant module according to one embodiment of the present invention;

FIG. 2 is a plan view showing a tamper resistant module according to another embodiment of the present invention;

FIG. 3 is a block diagram showing a connection of transistors constituting a memory device provided in the tamper resistant module according to the embodiment of the present invention;

FIGS. 4A and 4B are a plan view and a cross-sectional view cut along a line A—A in FIG. 4A showing, respectively, a tamper resistant module according to still another embodiment of the tamper resistant module of the present invention;

FIGS. 5A and 5B are plan views and FIGS. 5C and 5D are cross-sectional views cut along lines A—A and B—B in FIGS. 5A and 5B, showing a tamper resistant module according to yet another embodiment of the present invention;

FIG. 6 is a perspective view showing a tamper resistant module according to a further embodiment of the present invention;

FIG. 7 is a plan view showing a tamper resistant module according to still a further embodiment of the present invention;

FIG. 8 is a plan view showing a tamper resistant module according to a yet further embodiment of the present invention;

FIG. 9 is a plan view showing a tamper resistant module according to another embodiment of the present invention;

FIG. 10 is a plan view showing a tamper resistant module according to a further embodiment of the present invention;

FIG. 11 is a perspective view showing a tamper resistant module according to a still further embodiment of the present invention;

FIG. 12 is a plan view showing a tamper resistant module according to yet a further embodiment of the present invention;

FIG. 13 is a perspective view showing a tamper resistant module according to a further embodiment of the present invention;

FIG. 14 is a perspective view showing a tamper resistant module according to still a further embodiment of the present invention;

FIG. 15 is a plan view showing a tamper resistant module according to yet a further embodiment of the present invention;

FIG. 16 is a perspective view showing a tamper resistant module according to a further embodiment of the present invention;

FIG. 17 is a plan view showing a tamper resistant module according to still a further embodiment of the present invention;

FIG. 18 is a perspective view showing a tamper resistant module according to yet a further embodiment of the present invention;

FIG. 19 is a perspective view showing a tamper resistant module according to a still further embodiment of the present invention; and FIG. 20 is a block diagram showing a tamper resistant module according to the embodiment of the present invention.

DETAILED DESCRIPTION OF THE PREFERRED EMBODIMENTS

FIG. 1 is a perspective view showing a tamper resistant module 1 according to a first embodiment of the present invention, and FIG. 2 is an exploded perspective view showing the tamper resistant module of FIG. 1. Throughout the specification, the term "tamper" or "tampering" will be used to refer to an act attempting to decode confidential data contained in a memory by a mechanical force, a temperature change, by chemicals, any biochemical measure, or by a laser beam, etc.

As shown in FIG. 1, the tamper resistant module 1 comprises a pair of substrates 2, 3. The substrates 2, 3 have inner surfaces bonded together along peripheral regions forming bonding areas 2A, 3A as indicated by oblique hatching lines in FIG. 2. Memory devices 4 are present even beneath the bonding areas 2A, 3A. Two substrates 2, 3 are bonded together by directly applying a bonding material to the memory devices 4 or by an adhesive piece fixedly attached to the memory devices 4. The determination of the size of the bonding area and the selection of the bonding material are made so that the bonding strength holding the substrates 2, 3 together is larger than a strength of the respective layers of a transistor 8, to be described later with reference to FIG. 6, against a separation force. The memory devices 4 store safeguard information as is described in more detail below with reference to FIG. 20.

The tamper resistant module 1 thus fabricated can be made very thin and has an accurate ability to detect a tampering with the module from the horizontal direction as well as a tampering from the vertical direction. Even for a thick tamper resistant module of the invention, the tamper detecting accuracy in the horizontal direction can be maintained at a level similar to that in the vertical direction by depositing or arranging the memory devices on the side surface of the module.

Confidential data are stored in the confidential circuit 14 of FIG. 20, to be described below, inside of the bonding areas 2A, 3A. A bonding or adhesive material is coated on the peripheral portion of one of the substrates 2, 3, as mentioned. It is to be noted that the tamper resistant module 1 has a rectangular shape having a side dimension ranging from less than one millimeter to several centimeters. The size of the module can freely be determined although there is a minimum limitation attendant to the size of the memory device 4.

In the upper surface of the upper substrate 2 and of the lower surface of the lower substrate 3, the memory device 4 as shown in FIG. 3 is deposited by a vapor phase method or the like. The memory device 4 shown in FIG. 3 is a dynamic memory including three transistors Tr1, Tr2 and Tr3. Such a memory is disclosed in "The VLSI designer's Library" by J. Newkirk and R. Mathews, Addison-Wisley, 1983. The memory device 4 need not necessarily be of a dynamic type but a static type memory may be used. A plurality of memory devices 4 are arranged in line on the surfaces of the substrates 2, 3. Each memory device 4 has a write clock terminal, a read clock terminal, a data terminal, and a ground terminal. These terminals are interconnected among the plurality of memory devices. In FIG. 1 only a portion of the plurality of the memory devices is depicted on an enlarged scale. The size of each of the transistors Tr1, Tr2 and Tr3 is several ten microns. In order to simplify the illustration of the memory device 4 as in FIG. 3A, it will be depicted in a manner as shown in FIG. 3B.

The memory devices 4 are arranged on the surfaces of the substrates 2, 3 as shown in FIG. 4 or 5. Specifically, the transistors Tr1, Tr2 and Tr3 are arranged in staggered or checkerboard fashion. The cross-section of the memory device 4 along section line A—A in FIG. 4A, is as shown in FIG. 4B.

Should one or more than one of the transistors Tr1, Tr2 and Tr3 be tampered with, the memory device 4 loses its function. With a circuit shown in FIG. 20, to be described below, the contents of the detecting memory device 4 are written in and then immediately read out in repetitive manner to cover all the detecting memory devices of the module to thereby detect any tampered memory device. When a tampered memory is detected, the confidential data stored in the confidential circuit 14 are erased presuming that the detecting memory device has been tampered with.

It should be noted that there are two different groups of RAM cells in a tamper-resistant module. Confidential circuit 14, which is confined within an inner surface of the module, contains the memory proper. The memory device 4, which occupies the outer surface of the module, is the tamper detecting memory device. Using separate memory devices for an independent tamper-detecting circuit as described, provides a better detection and a better analysis of errors, whatever their cause, than could be obtained by using the same memory capacity for a conventional redundancy checking. The reason is as follows.

It is possible to precisely control the timing relation between reading and writing for a detecting memory device, as well as generally checking the history of the device. This device history is independent of the reading and writing history of the bits to be protected and stored in the confidential circuit 14. The detecting memory device can be tested by writing into it and reading from it with any desired intervals between successive actions.

In conventional memory organizations where redundancy is used for an error detection and analysis, these timing relations and histories are not known because they depend on the behavior of the application program that is using the memory. When examining a particular bit in a conventional memory, one does not know for certain when it was last written nor whether it was written with a "one" or a "zero". The redundancy bits provide only a probability guess as to what the correct state is and no information at all about when the last state transition took place.

If an error is found when testing a detecting memory device, according to the invention, the testing interval can be adjusted so as to determine the likely nature of the error: such as soft (transient), hard (permanent but accidental), or malicious (caused by a tamper with the device). The following three situations are discerned.

(1) If the error does not persist after repeated write-read cycles with short intervals, we assume that it is a soft error.

(2) If the error does not appear to be a soft error, we check the cells physically adjacent to the one that manifested the error. If the fraction of adjacent cells that are in error is less than some threshold, we assume that the error is a hard error.

(3) If the error is neither a soft error nor a hard error, we assume that it is caused by a tampering attempt. The correct response in this third case is to erase the confidential data in the inner surface.

In the example shown in FIG. 4, the detecting memory device 4 is pessimistically assumed to be operative even if a part of each of the transistors Tr1, Tr2 and Tr3 is lost. Even so, a tampering attempt can be detected if a portion ($3\epsilon \times 3\epsilon$ in size) surrounded by a thick solid line 5, see FIG. 4A, is lost where $\epsilon$ is the size of each transistor.

In the example shown in FIG. 5, a first layer 6 is superposed on a second layer 7. Specifically, the first and second layers 6 and 7 are superposed so that the cross-section of FIG. 5A, cut along a line A—A, is as shown in FIG. 5C, while the cross-section of FIG. 5B, cut along line B—B, is as shown in FIG. 5D. The transistors in the first layer 6 and in the second layer 7 are so arranged that the transistors in one layer fill the blank spaces in the other layer and vice versa. Therefore, a tampering attempt can be detected when an opening of about $2\epsilon \times 2\epsilon$ is formed when the first layer 6 and the second layer 7 are exposed to a tampering attempt.

Based upon this theory, if the detecting memory device 4 is fabricated with a multiplicity of layers, the diameter of a detectable hole can be reduced to $\epsilon$ at a minimum. Further, the detecting ability of the detecting memory device 4 can be improved by adjusting the sensitivity of the tamper detection by ANDing or ORing the relevant layers 6, 7, whereby it becomes possible to avoid an erroneous detection of a temporary or permanent malfunction of the memory device 4 which malfunction does not actually exist. Further, it is possible to avoid an erroneous detection of a tampering when none exists, by the provision of the memory device 4 in part of the outer surface of the substrate depending upon the portion where the confidential data is present.

FIGS. 1 to 5, have been described with reference to the memory device 4 in which a number of square-shaped MOS transistors Tr1, T42, Tr3 are arranged. However, transistors having an elongated shape are also available. Such an example is shown in FIG. 6 in which one side of the MOS transistor 8 is elongated. In FIG. 6A, the transistor 8 is fabricated with three layers namely a source layer 8A, a gate layer 8B, and a drain layer 8C. Lead wires of the source layer 8A and of the drain layer 8C extend to the right and the lead wire of the gate layer 8B extends to the left. The transistor 8 is deposited on the upper surface of the substrate 2 and the lower surface of the substrate 3 (see FIG. 1) by a vapor phase method or the like. Either the source layer 8A or the drain layer 8C may be arranged externally of the tamper resistant module 1.

In the examples shown in FIGS. 6B and 6C, the source layer 8A is arranged externally of the tamper resistant module 1. The example shown in FIG. 6B shows the case where the source layer 8A and the gate layer 8B are subjected to a mechanical tampering attempt. If the two layers of the transistor 8 are separated as shown by the tampering, the transistor 8 loses its function, whereby the inoperative memory device including such a transistor 8, is detected, the confidential data contained in the confidential circuit 14 is erased on the presumption that the detecting memory device 4 has been tampered with.

While FIG. 6 shows a linearly shaped transistor 8, FIG. 7 shows a transistor 8.1 folded in a zig-zag form. The lead wires of the source layer 8A and of the drain layer 8C extend to the left lower side and the lead wire of the gate layer 8B extends to the right upper side in FIG. 7. The transistor 8.1 is deposited on the upper surface of the substrate 2 and on the lower surface of the substrate 2 (see FIG. 1) by a vapor phase method. Each transistor 8.1 shown in FIG. 7 has a large area so that the number of the transistors arranged in the substrate 2 or 3 can be reduced.

FIG. 8 is a modification of the embodiment shown in FIG. 7. The lead wires of the source layer 8A, the gate layer 8B, and of the drain layer 8C of the transistor 8.2 extend from the upper left side of the device shown in FIG. 8, thereby facilitating the wiring. In addition, the embodiment shown in FIG. 8 is formed as a bifilar winding so that induction signals induced in forward and backward paths cancel each other out and thus a noise margin can be set high.

While FIG. 6 shows the embodiment in which the transistor 8 is in a linear shape, FIG. 9 shows an embodiment in which the transistor 8.3 has a spiral configuration. The lead wires of the source layer 8A and of the drain layer 8C extend from the center portion and the lead wire of the gate layer 8B extends from the outer circumferential portion. Each transistor 8.3 shown in FIG. 9 has a large area so that the number of the transistors arranged in the substrate 2 or 3 can be reduced.

FIG. 10 is a modification of the embodiment shown in FIG. 9. The lead wires of the source layer 8A, the gate layer 8B and of the drain layer 8C extend from the outer circumferential portion of the transistor 8.4, thereby facilitating the wiring. In addition, the embodiment shown in FIG. 10 also forms a bifilar winding so that induction signals induced in forward and backward paths cancel each other out and thus the noise margin can be set high.

FIG. 11 is a perspective view showing a modification of the tamper resistant module shown in FIG. 1. In FIG. 11, the same reference numerals are used as in FIG. 1 to designate the same components to avoid a duplicate description.

In the tamper resistant module 11 shown in FIG. 11, the substrates 2 and 3 are formed with a single elongated substrate as shown in FIG. 12. Bonding of the substrates 2 and 3 is achieved by folding the elongated substrate along a dotted line X. The determination of the size of the bonding area and the selection of the bonding material are made so that the bonding strength of the substrates 2, 3 is larger than a strength of the respective layers of a transistor 8 as described above.

When the elongated substrate is folded to bond the substrates 2, 3 together, the strength of the folded portion is differentiated from that of the bonded portion.

FIG. 13 is a modification of the embodiment of FIG. 12 in which four layers are superposed and are folded together to make the strengths in the folded portion and the bonded portions substantially even. In this modification, the folded areas are located in different positions. Specifically, the folded area Z of the first combination of the innermost substrates 2 and 3 is located in an upper position relative to an imaginary plane passing centrally and horizontally through FIG. 13. The folded area Z1 of the second combination of the substrates 2 and 3 is located in the rightward direction. The folded area Z2 of the third combination of the substrates 2 and 3 is located in the leftward direction, and the folded area Z3 of the fourth combination of the outermost substrates 2 and 3 is located in a lower position, or rather below said imaginary plane. In this manner, the positions in which the folded areas are located out of alignment relative to each other whereby the strengths of the module against any mechanical tampering efforts directed from the upper, lower, right and left directions can be made substantially even. Stated differently, the present module is equally tamper proof against tampering efforts from all directions.

FIG. 14 is a further modification of the tamper resistant module shown in FIG. 1. In FIG. 14, the same reference numerals as those used in FIG. 1 or FIGS. 11 to 13 designate the same components. The tamper resistant module of FIG. 14 is formed with a single elongated substrate as shown in FIG. 15. The elongated substrate is folded along dotted lines Y in the directions as indicated in FIG. 15 so as to partially overlap the end portions of the substrate as shown in FIG. 14.

In the case where the tamper resistant module 1 is made in a manner as described, the strength in the central overlapped portion differs from that in the remaining portion. In the embodiment shown in FIG. 16, one combination of the substrates 2, 3 is arranged to wrap another combination of the substrates 2, 3, so that overlapped zones of the substrates 2, 3 intersect with each other. Specifically, the inner combination of the substrates 2, 3 is disposed so that its overlapped portion is oriented in a first direction and the outer combination of the substrates 2, 3 is disposed so that its overlapped zone is oriented in a second direction orthogonal to the first direction. Since the overlapped zones of the inner and outer combinations of the substrates 2, 3 intersect with each other, the strength of the tamper resistant module 1 can be made substantially even against any tampering attempt applied from the first and second directions.

FIGS. 17 to 19 are perspective views showing other modifications of the tamper resistant module shown in FIG. 1. In FIGS. 17 to 19, the same reference numerals as those in FIGS. 11 to 16 designate the same components.

In the tamper resistant module of FIG. 17, the substrates 2, 3 are formed by a single rectangular substrate. The rectangular substrate is folded inwardly along the dotted lines A, B, C, whereupon the bonding areas 2A, 3A are bonded together.

In the embodiment shown in FIG. 18, three tamper resistant modules are combined together, in which the positions of the bonding zones are different from one another as shown in FIG. 19. These three tamper resistant modules are combined to form a cubic box configuration, thereby allowing confidential data to be disposed inside the cubic box.

FIG. 20 is a block diagram showing a circuit for erasing confidential data which is rendered operative when a tampering attempt is detected. The confidential data have been written in a confidential circuit 14 which is constructed with a random access memory (RAM). Disposed inside of the tamper resistant module are an address generating circuit 10 for storing safeguard information in the memory devices 4, a read data discriminating circuit 11, a confidential data erasing circuit 12, a writing circuit 17, and a reading circuit 18 together with the confidential circuit 14. The memory devices 4 are disposed outside of the tamper resistant module 1. A power supply 13 may be provided either inside of the tamper resistant module 1 or outside thereof if a backup is provided or an instantaneous interruption of the power supply can be appropriately dealt with.

The circuit diagram shown in FIG. 20 provided for the memory device 4, which is made of a dynamic RAM 4, operates as follows. To the memory device 4, an address signal is supplied from the address generating circuit 10. The writing circuit 17 writes bits indicative of a random value or a predetermined value in the memory device 4 designated by the address. The address generating circuit 10 is constructed, for example, with a counter, which performs an addressing operation for all the memory devices 4. The content of the memory device 4 is immediately read out by the reading circuit 18. Since the memory device 4 is constructed with a dynamic RAM, no refreshing operation is required.

The data written in the memory device 4 and the data read out of the memory device 4 are fed to the read data discriminating or comparing circuit 11. The latter circuit 11 is constituted, for example, with an exclusive logic OR circuit and checks whether or not the data written into the memory device 4 coincide with the data read out of the memory device 4. Upon inverting the value written in the memory device 4, i.e. inverting "0" and "1", the discriminating circuit 11 again checks whether or not the data written in the memory device 4 coincide with the data read out of the memory device 4. By the implementation of such checkings, functions imposed on all the transistors Tr1, Tr2, Tr3, constituting the memory device 4 can be perfectly examined. The result of the examination is supplied to the confidential data erasing circuit 12.

The confidential data erasing circuit 12 comprises, for example, an analog switch which allows the power supply 13 to connect ground through a resistor 19. The circuit 12 is normally in an open state. Due to the open state of the circuit 12, the power is supplied to the confidential circuit 14 to hold the confidential data stored therein. The confidential data are written into the confidential circuit 14 through an input terminal 15 and are read out thereof from an output terminal 16. The read out of confidential data is used only within the tamper resistant module 1. In the event that there is a tampering attempt against the damper resistant module 1, either of the transistors Tr1, Tr2, Tr3 is damaged with the result that the memory 4 loses its function and the data written therein cannot be properly outputted, that is, there will be an inconsistency or non-coincidence between the written-in and read-out contents.

If such a non-coincidence exists between the written-in and read-out contents, the read data discriminating circuit 11 detects the inconsistency and switches the confidential data erasing circuit ON, whereby power normally supplied to the confidential circuit 14 is interrupted and hence the contents stored therein is erased.

It is not necessary that the power supply 13 and power supplies to the memory devices 4, address generating circuit 10, read data discriminating circuit 11, confidential data erasing circuit 12, writing circuit 17 and the reading circuit 18 are batteries contained in the tamper resistant module 1. Rather, the power supply may be a combination of a commercial power supply and an external or internal backup battery for use in case of an interruption of the commercial power supply. In the case where the power supply battery is externally provided, an external or internal large capacitor may be provided to compensate for an instantaneous interruption of the external commercial power supply.

In the event that the power supply should be interrupted, that is, in the case where the backup battery has been removed or has been used up and the external commercial power supply has been interrupted for a long period of time, the protection of the confidential data in the confidential circuit 14 can still be accomplished if the operating voltages and the time constant have been set so that the turn off of the power supply to the memory devices 4, address generating circuit 10, read data discriminating circuit 11, confidential circuit 12, writing circuit 17 and reading circuit 18 occurs after the turn off of the power supply to the confidential circuit 14. Because, insofar as the storing contents (confidential data) exist in the confidential circuit 14, the tamper detecting function and the confidential data erasing function remain in force.

Under an extremely low temperature, the storing of the confidential data is sometimes maintained in the confidential circuit 14 without need for a power supply. The tamper resistant module is required to protect the confidential data against a tampering attempt by exposing the module to these low temperatures. Since the period of time during which the temperature of the module shifts from the normal operating temperature to the extremely low temperature is sufficiently long, such a temperature tampering can be detected during this period of time, whereupon the storing content in the confidential circuit 14 is erased.

The circuit shown in FIG. 20 can be modified in a variety of ways. For example, the memory device 4 need not be a dynamic RAM but be a read-only memory (ROM) or an erasable programmable read-only memory (EPROM). If the memory device 4 comprises a ROM or an EPROM, all or part of the writing circuit can be dispensed with.

A time required to cyclically examine all the detecting memory devices 4 must be shorter than a time required to access the confidential data starting with the begin of a tampering effort. The latter time is in the order of several seconds. Therefore, the time for examining all the memory devices 4 is allowed to be slower than, for example, a refreshing cycle of a video display memory. In the case where the number of the memory device 4 is extremely large, they may be divided into a plurality of banks and a corresponding number of tamper detection circuits may be provided in a one-to-one correspondence to the plurality of banks, whereby the detection speed can be increased.

There are cases where no detecting device is present in a particular address or the detecting device in a certain address is inoperative. In such cases, it is possible not to carry out the tamper detection for that nonexistent or inoperative portion. If there are a considerable number of addresses which are not subjected to a tamper detection, a non-examination bit map may be employed on which the addresses are indicated which are not subjected to a tamper detection. The non-examination bit map is constituted with a ROM. After the manufacture of the tamper resistant module and before the shipment thereof, a search is conducted to find out any absence of the detecting device or the malfunction of the detecting device, whereupon the respective data is written in the ROM.

The device protected by the tamper resistant module shown in FIG. 20 can communicate with an external station. Further, an address holding register may be provided to store the address outputted from the address generating circuit 10 when the read data discriminating circuit 11 detects a tampering for utilizing the stored data in the subsequently performed examination. A time holding register may be provided to store the output from a real time clock when the read data discriminating circuit 11 detects a tampering, for use in the subsequent examination.

Upon measuring the power supply voltage or an ambient temperature, the circuit can be modified to detect a tampering if there is a significant change in the power supply voltage or in the ambient temperature.

Although the present invention has been described with reference to specific embodiments, a variety of changes and modifications may be made without departing from the scope and spirit of the invention. For example, although in the above described embodiments, the detecting memory devices are provided externally of the module in which the confidential data is contained and the tamper detection is performed through the detection of the storing contents in the detecting memory devices, the tamper detection can also be accomplished by the detection of the operations of digital devices other than the memory devices, e.g. shift register, logic devices using super conductive materials.

What is claimed is:

1. A tamper resistant module for safeguarding stored confidential information, comprising substrate means having an inner surface and an outer surface, memory means supported on said inner surface of said substrate means for storing said confidential information in said memory means supported on said outer surface of said substrate means for providing a testing value, tamper detection circuit means on said inner surface connected to said testing value providing means and to said memory means for erasing said confidential information from said memory means when a tamper is detected in response to said testing value, said tamper detection circuit means comprising address generating circuit means connected to said testing value providing means for supplying address signals to said testing value providing means, a reading circuit connected to said testing value providing means for reading said testing value from said testing value providing means, and testing value comparing circuit means connected to said reading circuit for comparing values from said reading to provide a tamper detection signal if there is any difference between values from said testing value and from said reading circuit.

2. The tamper resistant module of claim 1, further comprising a writing circuit connected to said testing value providing means for writing said testing value into an address of said testing value providing means, said testing value comparing circuit means being connected to said writing circuit and to said reading circuit for comparing values from said reading and writing circuits to provide a tamper detection signal if there is no coincidence between values from said writing circuit and from said reading circuit.

3. The tamper resistant module of claim 1, further comprising erasing circuit means connected to said comparing circuit and to said memory means for erasing said confidential information in response to said tamper detection signal.

4. The tamper resistant module of claim 1, wherein said testing value providing means comprise of a plurality of logical elements arranged in at least two layers on said substrate means.

5. The tamper resistant module of claim 1, wherein said testing value providing means comprise a ROM.

6. The tamper resistant module of claim 1, wherein said testing value providing means comprise an erasable, programmable read-only memory (EPROM).

7. The tamper resistant module of claim 2, wherein said testing value providing means comprise a dynamic RAM.

8. The tamper resistant module of claim 2, wherein said testing value providing means comprise a static RAM.

* * * * *